United States Patent [19]

Sampson

[11] 3,734,982
[45] May 22, 1973

[54] PROCESS FOR CASE BONDING CAST COMPOSITE PROPELLANT GRAINS

[75] Inventor: Henry T. Sampson, China Lake, Calif.

[73] Assignee: The United States of America as represented by the Secretary of the Navy, Washington, D.C.

[22] Filed: Feb. 2, 1962

[21] Appl. No.: 170,849

[52] U.S. Cl. ................. 264/3 R, 156/242, 156/331, 149/2, 149/94, 149/96
[51] Int. Cl. ............................................. C06b 21/02
[58] Field of Search ................. 18/59, 26; 117/75; 60/35.6; 86/1; 156/329, 242, 331; 264/3, 3 R; 149/2

[56] References Cited

UNITED STATES PATENTS

| | | | |
|---|---|---|---|
| 2,877,504 | 3/1959 | Fox | 18/59 |
| 2,957,309 | 7/1957 | Kobbeman | 60/35.6 |
| 3,027,597 | 4/1962 | McCurdy | 18/26 |
| 3,030,249 | 4/1962 | Schollenberger | 117/75 |
| 3,032,438 | 5/1962 | Gaynes et al. | 117/75 |
| 3,032,975 | 3/1957 | Alden | 60/35.6 |

Primary Examiner—Stephen J. Lechert, Jr.
Attorney—R. S. Sciascia and R. Miller

EXEMPLARY CLAIM

1. The method of bonding composite propellant grains to rocket motor tubes which comprises
   a. coating the inside of the tube with a formulation consisting essentially of
      60 percent by weight castor oil and
      31 percent by weight 2,4-toluene diisocyanate to form a first liner,
   b. applying to said first liner before curing a second liner consisting of a silicon tape composed of glass cloth impregnated with a composition consisting essentially of
      1. a benzene soluble resin polymer composed essentially of structural units of $SiO_2$ and $R_3SiO_{1/2}$ where R is a monovalent hydrocarbon selected from the group consisting of alkyl radicals of less than four carbon atoms and phenyl and at least 90 percent of the total number of R radicals are alkyl and in said copolymer the ratio of $R_3SiO_{1/2}$ units is between 0.6 to 0.9 inclusive, and
      2. a benzene soluble organosiloxane of at least 1 million centistokes viscosity at 25° C., said organosiloxane having the general formula $R'_2SiO$ wherein R' is a monovalent hydrocarbon radical selected from the group consisting of methyl and phenyl and at least 90 percent of the total number of R' radicals are methyl.
   c. casting a composite propellant composition into said tube, and
   d. curing up to 4 hours at temperatures ranging up to 200° F.; whereby the first and second liners and the propellant grain together are firmly bonded to the inside of the motor tube.

1 Claim, No Drawings

3,734,982

PROCESS FOR CASE BONDING CAST COMPOSITE PROPELLANT GRAINS

The invention herein described may be manufactured and used by or for the Government of the United States of America for governmental purposes without the payment of any royalties thereon or therefor.

The present invention relates to an improved process for case bonding cast composite propellant grains within a rocket motor chamber.

A rocket motor commonly comprises a metal combustion chamber or casing having an exhaust nozzle, a liner and a propellant charge or grain within the rocket chamber. Methods for supporting a propellant grain within the combustion chamber include bonding in place, as will be described later, or supporting the grain in the chamber or case by means of springs or other mechanical devices. Bonding has several advantages over mechanical support; the grain is uniformly secured at all points and is less subject to high localized loads and makes the rocket motor and propellant better able to withstand stresses such as those caused by acceleration, dropping, vibration and burning. Bonding also gives better protection against burning along the sides of the grain. However, all propellant grains are not capable of being reliably bonded by present methods. The present invention provides a suitable method for case bonding composite propellant grains directly to a rocket motor chamber or casing in a manner such that the system will withstand temperature cycling and mechanical vibration.

It is an object of the present invention to provide a method for case bonding a propellant grain directly into a rocket motor tube.

Another object is to provide a case bonding method for composite propellant grains utilizing a double liner system which will withstand temperature cycling and mechanical vibration.

Still another object of this invention is the provision of a method of case bonding composite propellant grains so that they can be reliably fired at temperatures as low as −20° F.

The objects are accomplished by first coating the inside of a rocket motor chamber or casing with a thermosetting polyurethane composition and then applying a silicone tape to this polyurethane surface. The motor casing is now ready for casting a composite propellant mixture.

The method used in the bonding system of the present invention comprises coating, by spraying, brushing, or the like, the inside of the rocket motor chamber, tube or casing with a layer of a thermosetting polyurethane, then applying a silicone tape (glass cloth impregnated with a silicone adhesive) to the polyurethane surface. The tape should be 0.020 of an inch or less in thickness and the polyurethane surface must be free from dirt or grease. The polyurethane is considered to be the first liner and the silicone tape the second liner. After the tube has been lined it is ready to be cast with composite propellant composition. If the grain has been precast, the grain is wrapped with silicone tape, then positioned inside the rocket motor tube and potted in place with thermosetting polyurethane.

The present invention using the double liner method of bonding composite propellant grains has several advantages which are improvements over any process known to be in use at the present time. If silicone tape is used alone as a bonding material, it is found to have insufficient elongation or compressibility to prevent separation from occurring either between the liner and the motor tube wall or the liner and the propellant. This separation will occur because of shrinkage of the propellant after curing or after cooling of the rocket motor to low temperature. If a polyurethane polymer or thermosetting polyurethane is used as a single liner for the purpose of bonding a composite propellant to the motor tube, it is found that the bond between the propellant and tube is not strong enough to prevent separation from occurring. However, if these two materials (silicone tape and polyurethane) are combined in the manner described above, it is found that the composite propellants can be successfully bonded and fired at temperatures as low as −20° F.

The thermosetting polyurethane used successfully as a first liner in the present invention comprises about 66 percent by weight castor oil and about 34 percent by weight 2,4-toluene diisocyanate.

Although various silicone tapes may be used, the silicone tape utilized in the present invention comprises glass cloth impregnated with a silicone adhesive which is fully described in U. S. Pat. No. 2,736,721. It comprises a mixture of (a) 5 – 70 percent by weight of a benzene soluble resin copolymer of $SiO_2$ and $R_3SiO_{1/2}$, where R is an alkyl radical of less than four carbon atoms or a phenyl radical, and where the ratio of $R_3SiO_{1/2}$ units to $SiO_2$ units is between 0.6 – 0.9 inclusive, and (b) 95 – 30 percent by weight of a diorganopolysiloxane having the general formula $R_2'SiO$, where $R'$ is methyl or phenyl and having a viscosity of at least 1 million cs. at 25° C. In each of ingredients (a) and (b), at least 90 percent of the total number R and $R'$ radicals respectively are alkyl.

Various formulations were tested in an attempt to find a singular bonding agent which would have the necessary bond strength to metal surfaces and sufficient elongation and elasticity to prevent separation between the rocket casing the the propellant. For example, ethyl cellulose was crosslinked with 2,4-toluene diisocyanate. This was done either by reacting the ethyl cellulose with 2,4-toluene diisocyanate in a molten solution containing castor oil, or polypropylene glycol, or by reacting 2,4-toluene diisocyanate with ethyl cellulose in a mixture of castor oil and acetone. The results of 34 tests showed that formulations containing ethyl cellulose, 2,4-toluene diisocyanate, and castor oil bond fairly well to the propellant when the ratio of ethyl cellulose to castor oil is not greater than 3 to 4. Formulations containing polypropylene glycol, or dipropylene glycol gave poor bonds. The products of these formulations are very hard and have little elongation.

Since it was apparent from experimentation that none of the above mentioned materials would function alone as a case bonding agent, work was directed at determining the feasibility of using a combination of materials. Thermosetting polyurethane was used as a first liner since it had the necessary bond strength to metal surfaces and also sufficient elongation. Polyester and crosslinked ethyl cellulose films were grafted to the polyurethane and used as second liners. It is postulated that the available isocyanate groups on the surface of the uncured polyurethane react with available hydroxyl groups of the polyester or ethyl cellulose and form strong bonds. It was found that silicone tape as a second liner was even more effective. The silicone adhesive tape used herein is especially suitable as a rocket casing liner because its physical properties are practically independent of temperature and it is inert to the ingredients of composite propellant grains. Its compatibility with the grain formulations is important because the tape as used here is considered the second liner of the motor casing lying adjacent the propellant grain.

The double liner system of case bonding of the present invention was tested by lining long steel rocket motor tubes first with a polyurethane formulation comprising 66 percent castor oil and 34 percent 2,4-toluene diisocyanate and then with the silicone tape above described, casting the composite propellant (in this instance plastisol nitrocellulose propellant) and curing for from 2 – 4 hours at from 180° – 200° F. AFter cooling to room temperature the motors were X-rayed to determine the condition of the propellant and of the bond between the double liner and propellant. A few separations of less than 0.005 of an inch were observed.

Thus this invention provides a double liner bonding system which in its broadest sense encompasses a composite propellant grain securely adhered to the metal casing of a rocket motor by means of two layers of bonding material situated between the casing and the grain. This invention has been described in terms of a double liner which bonds a solid propellant to a metal casing; however, this invention is equally applicable for lining other containers to which other materials may be bonded where the thickness of the space between the object and the container is small. Obviously many modifications and variations of the present invention are possible in the light of the above teachings. It is therefore to be understood that within the scope of the appended claims the invention may be practiced otherwise than as specifically described.

What is claimed is:

1. The method of bonding composite propellant grains to rocket motor tubes which comprises
   a. coating the inside of the tube with a formulation consisting essentially of
      66 percent by weight castor oil and
      34 percent by weight 2,4-toluene diisocyanate to form a first liner,
   b. applying to said first liner before curing a second liner consisting of a silicone tape composed of glass cloth impregnated with a composition consisting essentially of
      1. a benzene soluble resin polymer composed essentially of structural units of $SiO_2$ and $R_3SiO_{1/2}$ where R is a monovalent hydrocarbon selected from the group consisting of alkyl radicals of less than four carbon atoms and phenyl and at least 90 percent of the total number of R radicals are alkyl and in said copolymer the ratio of $R_3SiO_{1/2}$ units is between 0.6 to 0.9 inclusive, and
      2. a benzene soluble organosiloxane of at least 1 million centistokes viscosity at 25° C., said organosiloxane having the general formula $R'_2SiO$ wherein R' is a monovalent hydrocarbon radical selected from the group consisting of methyl and phenyl and at least 90 percent of the total number of R' radicals are methyl.
   c. casting a composite propellant composition into said tube, and
   d. curing up to 4 hours at temperatures ranging up to 200° F.; whereby the first and second liners and the propellant grain together are firmly bonded to the inside of the motor tube.

* * * * *